United States Patent [19]

Krause et al.

[11] Patent Number: 4,981,500
[45] Date of Patent: Jan. 1, 1991

[54] VENTURI TYPE COOLER FOR FLUE GAS DESULPHURIZATION DEVICE

[75] Inventors: Heinz Krause, Moers; Horst Schulz, Bochum, both of Fed. Rep. of Germany

[73] Assignee: Thyssen Industrie AG, Essen, Fed. Rep. of Germany

[21] Appl. No.: 445,900

[22] Filed: Dec. 1, 1989

Related U.S. Application Data

[63] Continuation of Ser. No. 254,717, Oct. 7, 1989, abandoned.

[30] Foreign Application Priority Data

Oct. 9, 1987 [DE] Fed. Rep. of Germany ... 8713583[U]

[51] Int. Cl.$^5$ .............................................. B01F 3/04
[52] U.S. Cl. ..................................... 55/226; 261/44.1; 261/44.7; 261/44.2; 261/44.6; 261/DIG. 54; 261/53
[58] Field of Search ................ 261/44.1, 44.7, 44.2, 261/44.6, DIG. 54, 23.1, 53; 55/226

[56] References Cited

U.S. PATENT DOCUMENTS

| | | | |
|---|---|---|---|
| 2,801,086 | 7/1957 | Fish | 261/44.2 |
| 2,863,318 | 12/1958 | Schroder | 261/DIG. 54 |
| 2,995,349 | 8/1961 | Kennedy, Sr. | 261/44.2 |
| 3,202,404 | 8/1965 | Brandwood et al. | 261/44.2 |
| 3,347,024 | 10/1967 | Dock et al. | 261/DIG. 54 |
| 3,807,711 | 4/1974 | Hirao et al. | 261/44.1 |
| 3,979,455 | 8/1976 | Dahlem | 261/44.1 |
| 4,144,041 | 3/1979 | Hou | 55/226 |
| 4,260,563 | 4/1981 | Brulhet | 261/DIG. 54 |
| 4,263,233 | 4/1981 | Fenn | 261/44.6 |
| 4,610,849 | 9/1986 | Camp et al. | 55/226 |

FOREIGN PATENT DOCUMENTS

| | | | |
|---|---|---|---|
| 2417569 | 11/1974 | Fed. Rep. of Germany | 55/226 |
| 1465317 | 2/1977 | United Kingdom | 261/DIG. 54 |

*Primary Examiner*—Tim Miles
*Attorney, Agent, or Firm*—McGlew and Tuttle

[57] ABSTRACT

A Venturi Cooler for flue gas desulphurization devices sprays water through water spray nozzles on pipes positioned perpendicularly to the longitudinal flow direction of the cooler. It is important for the effectiveness of the diffused water that the speed of the flue gas does not fall below a certain limit. A simple adjustment of the cross section of the Venturi cooler to the respective flue gas amount can be achieved by arranging movable baffles on the pipes. The baffles are positionable to reduce the cross section of the Venturi cooler and leave the openings of the water spray nozzles free. They advantageously comprise rotatable sleeves surrounding the pipes and have rotatable flaps for fast adjustment of the cross section.

10 Claims, 8 Drawing Sheets

VENTURI TYPE COOLER FOR FLUE GAS DESULPHURIZATION DEVICE

This is a continuation of application Ser. No. 254,717 filed Oct. 7, 1989, now abandoned.

FIELD AND BACKGROUND OF THE INVENTION

This invention relates in general to heat exchangers and in particular to a new and useful Venturi-type cooler for a flue gas desulphurization device.

The invention relates to a flue gas desulphurization device with several pipes positioned perpendicularly to the longitudinal or flow direction of the cooler and with water spray nozzles. With this kind of cooler, it is important for the effectiveness of the water diffused through spray nozzles that the speed of the flue gas is kept within a certain range. In particular, the speed of the flue gas must not fall under a certain limit. The amount of flue gas flowing through Venturi-type coolers per unit of time is determined by the service conditions of the plant whose flue gases are to be desulphurized. In known Venturi coolers, the flow speed is determined by the layout of the diameter of the cross section. If the service conditions change substantially, especially if the amount of flue gas decreases, the cross section can be decreased by inserts on the sidewalls of the Venturi cooler. Such measures are complicated and laborious.

SUMMARY OF THE INVENTION

The invention provides a Venturi cooler whose cross section can be adjusted in an easy manner with regard to specific requirements.

In the Venturi coolers described, this problem is solved by arranging baffles on the pipes which narrow the cross section of the flow and which leave the water spray nozzles open. The pipes for the water spray nozzles are easily accessible and for maintenance reasons easily removable by pulling them out sidewards. Therefore, the cross section of the flow can be reduced quickly and easily by baffles which are mounted to the pipes and leave the water spray nozzles free. The pipes serve as a support for the baffles, which can therefore comprise a simple sheet metal construction, glass fiber reinforced plastic, or other materials. Changes in the area of the cross section covered by the baffles can be effected in a quick and flexible manner through the size of their respective cross section and by equipping a smaller or larger number of pipes with baffles. Because the flue gas flux can be kept within a favorable range, a relatively small amount of spray water is needed per time unit and the spray water pumps can be relatively small.

In detail, the invention may be constructed favorably as follows: As the baffles are sleeves with openings facing the spray nozzles and fitting on the pipes, they can be installed easily by simply slipping them over the pipes. The openings can be formed either as separate openings facing the spray nozzles or as a continuous slot in the sleeve line of the sheet metal sleeve.

A change in the cross section of the diameter during service without dismounting and mounting the pipes can be achieved by swinging them laterally if the baffles are equipped with flaps extending in a longitudinal direction or a flow direction.

Because the rotatable flaps have a width equivalent to the distance between two pipes, the free cross section of the Venturi cooler can be closed nearly completely if the flaps are moved in a horizontal swing to a limit stop.

The flaps can be moved easily because they are mounted on sleeves which are slipped over the pipes and can be turned on them. Their openings are large enough in the direction of rotation to leave the nozzles open in all positions.

Good stability and favorable behavior of the rotatable flaps with regard to the flux can be achieved if a pair of flaps is attached to the rotatable sleeve. One on either side of its axle and connected at their free ends.

This connection can be executed in the shape of a sharp edge. Another option would be to connect them by forming a round edge, the two flaps, connected to the sleeve on either side, being approximately parallel to each other.

An especially large maximal cross section of the flow can be achieved by fixing the rotatable flaps to the pipes and mounting the pipes rotatably.

Accordingly, it is an object of the invention to provide a Venturi-type cooler which comprises a housing defining a flow path therethrough with a plurality of liquid pipes extending through the flow path, each having a discharge nozzle for a liquid with baffle means carried by said pipes which are selectively adjustable for causing selective portions of the flow path.

A further object of the invention is to provide a Venturi-type cooler which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

DESCRIPTION OF THE PREFERRED EMBODIMENTS

Figure 1:
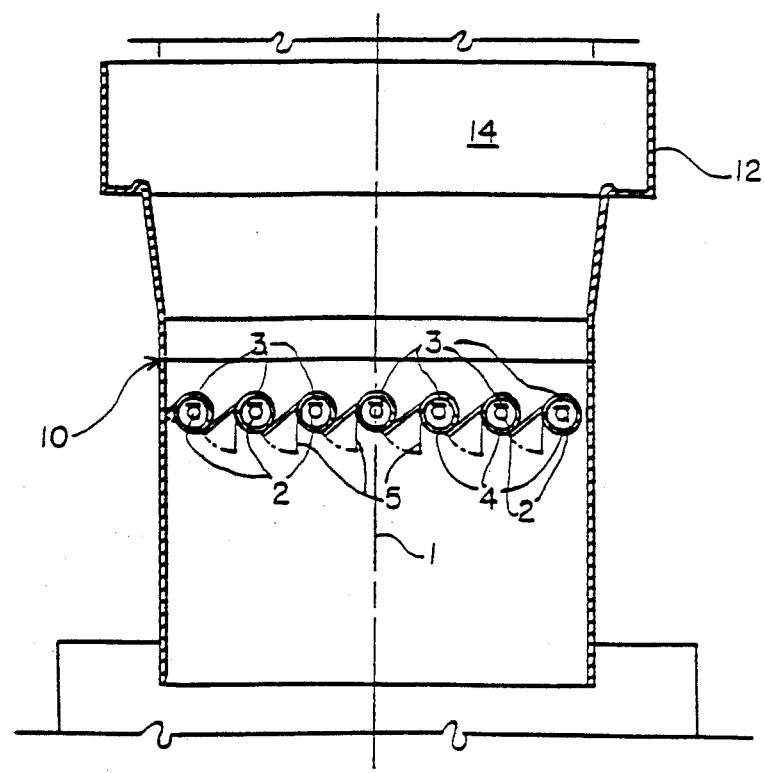
FIGS. 1 to 3 are transverse cross sectional views of a Venturi cooler for a flue gas desulphurization plant showing different executions possible for the Venturi cooler with sleeves with flaps on the pipes.
Figure 5:
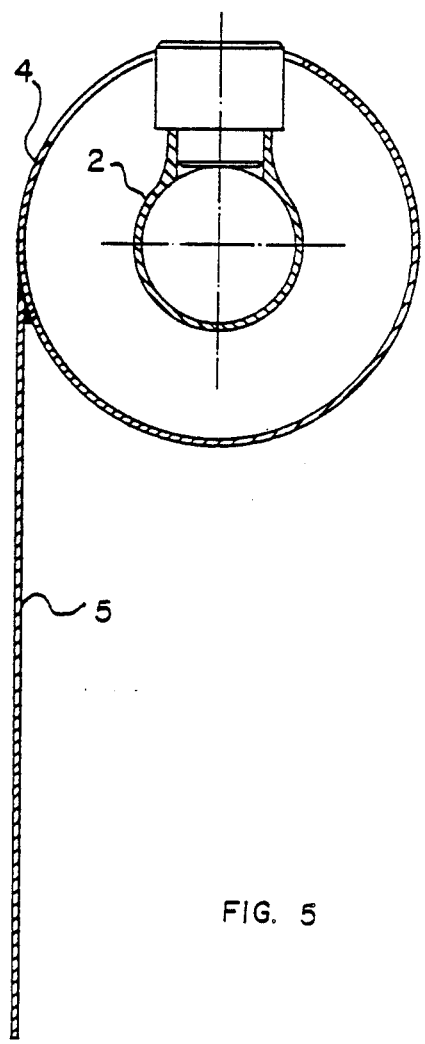
FIG. 5 is an enlarged sectional view showing the flap of FIG. 1.
Figure 6:
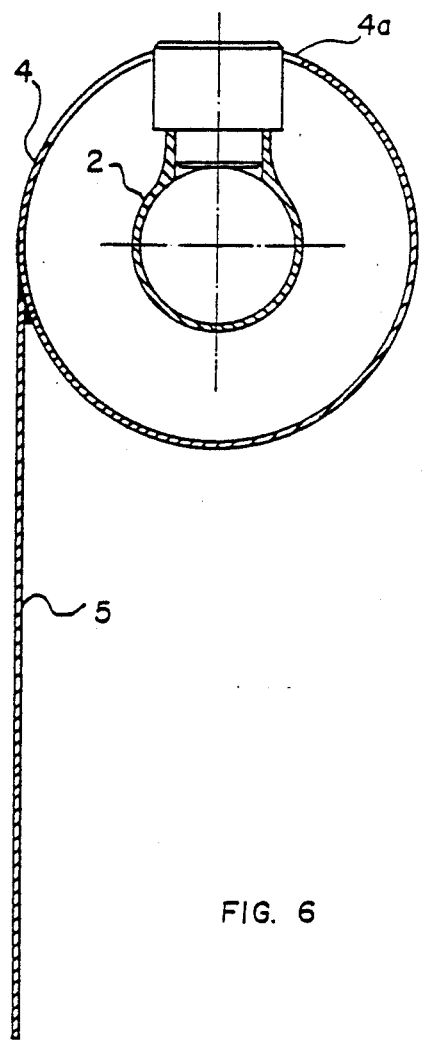
FIG. 6 is an enlarged sectional view showing the flap of FIG. 2.
Figure 7:
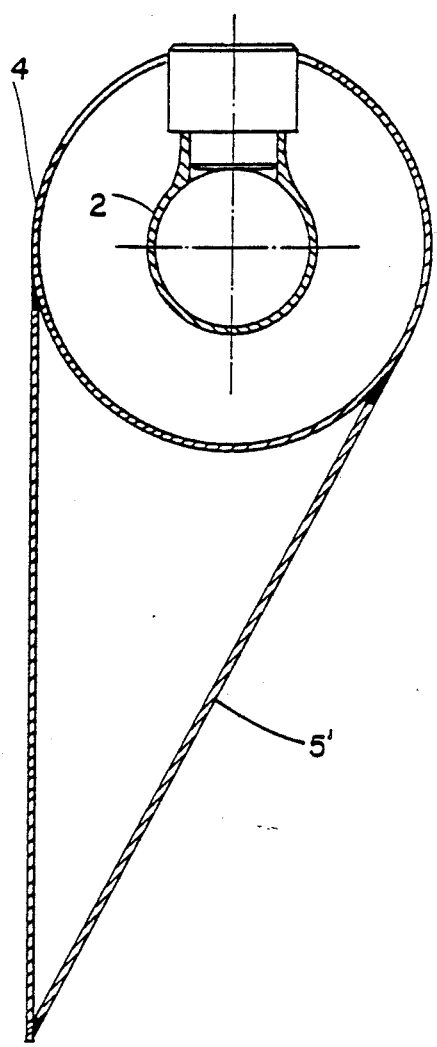
FIG. 7 is an enlarged sectional view showing the flap of FIG. 3.
Figure 8:
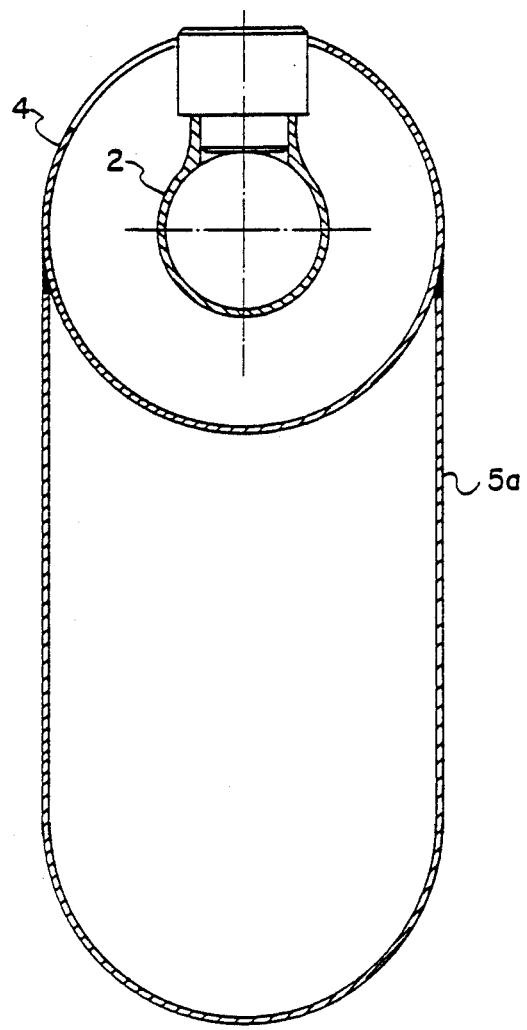
FIG. 8 is an enlarged sectional view showing the flap of FIG. 4.
Figure 9:
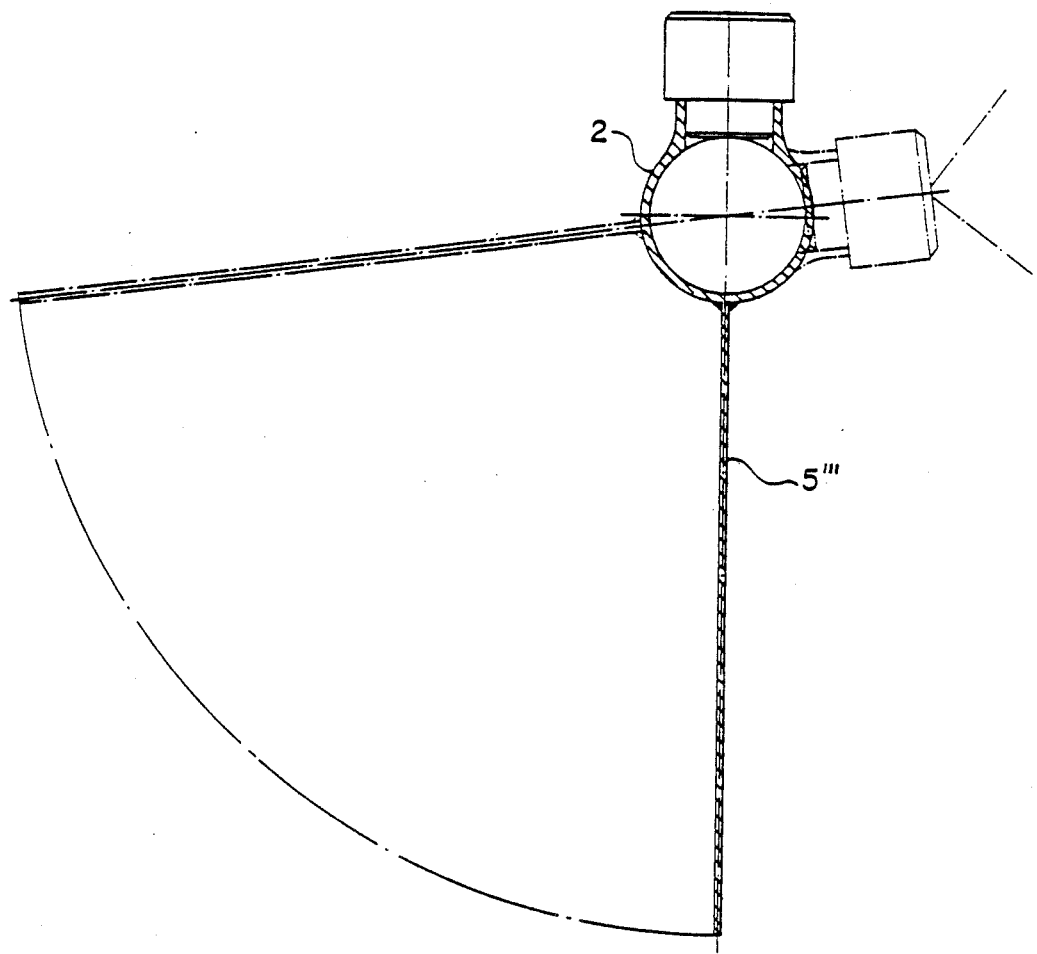

Referring to the drawings in particular the invention embodied therein as shown in FIG. 1 and FIG. 5 comprises a Venturi-type cooler generally designated 10 which comprises a housing 12, having an interior 14 defining a flue path for gases. In accordance with the invention, a plurality of liquid pipes 2 are arranged to extend through the flow path transverse to the longitudinal axis 1 thereof. With nozzles 3 are associated either selected ones or all of the pipes 2 which discharge water into the flow path. The cross section of the flue path is reduced by baffle means including a surrounding baffle sleeve 4 as shown in FIG. 1 and FIG. 5 with flow openings 4a which are alignable with the nozzle's spray discharge nozzles to permit a cooling water spray to pass therethrough.

The baffle means in the embodiment of FIG. 1 only includes the additional baffle elements or baffle flaps 5 which are mounted on or with the sleeves and rotated in respect to the nozzles to close off selective portions of the flow path through the housing 14.

The rotatable flaps 5 positioned in the direction of the flow which is equivalent to the longitudinal direction 1 of the cooler are connected to the sleeves 4. The sleeves 4 can be rotated around their longitudinal axis. The rotatable flaps 5 have a width equivalent to the distance between two tubes in the direction of the gas flow.

Figure 2:
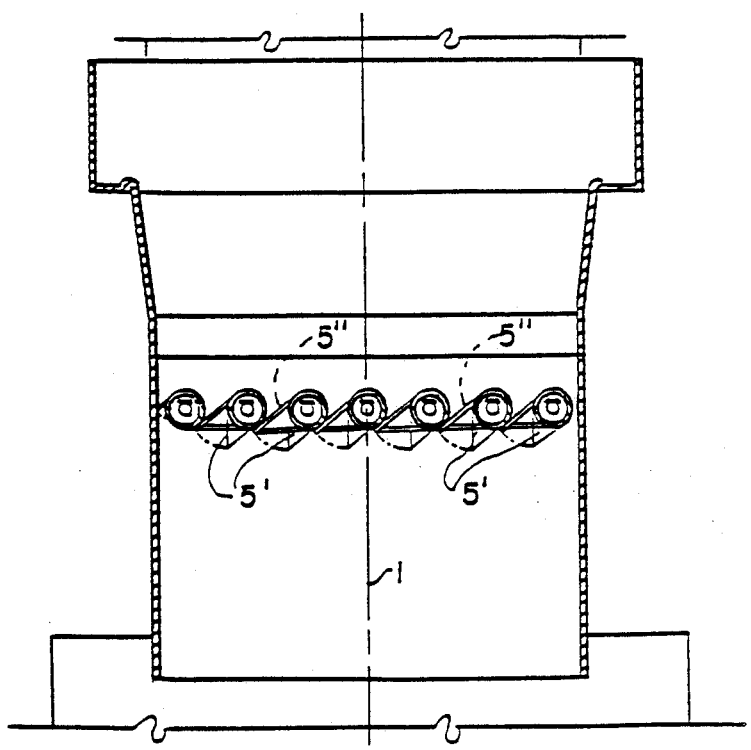

In FIG. 2, two rotatable flaps 5' and 5" are connected to a rotatable sleeve 4, one on either side. They have a sharp-edged connection at the bottom end. The flaps 5' and 5" according to FIG. 2 are made from sheet metal. They can either be welded together or bordered at the sharp bottom edge. However, it is easier to make them from one piece and edge them on an edging bench. The flaps shown at 5a in FIG. 3 are preferably made in one piece and are connected to the sleeve 4.

Figure 3:
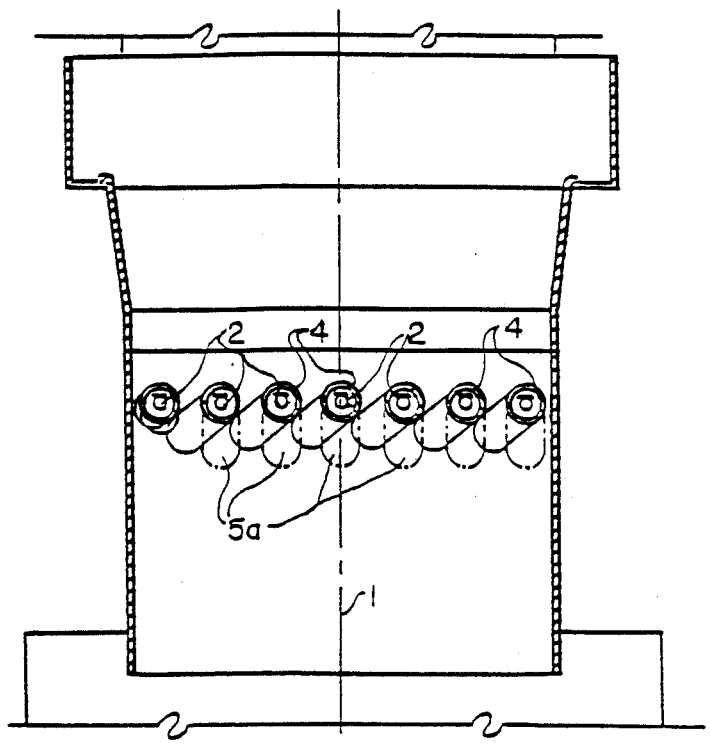

In FIG. 3 the bottom connection of the two types of flaps 5' and 5" is round.

Figure 4:
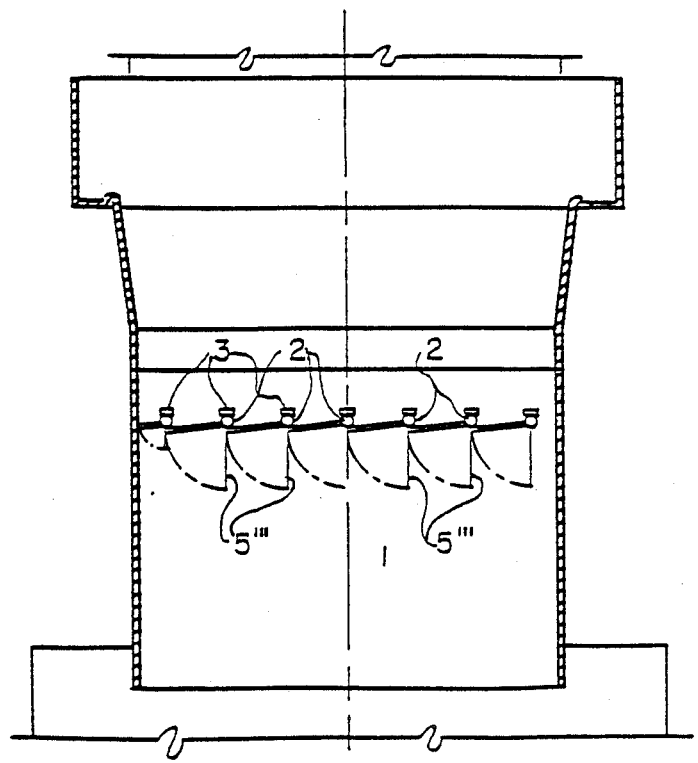
FIG. 4 is a section through a Venturi cooler with rotatable flaps mounted to the pipes.

According to FIG. 4, the rotatable flaps 5''' are connected to the pipes 2 directly without sleeves. The pipes 2 are mounted rotatably on their axis.

In FIG. 1 the cross section is increased and reduced without any demounting or mounting of the sleeves on the pipes by the rotation of the sleeves 4 and thus the rotation of the flaps 5. The position of the flaps at the smallest flow cross section is shown as a dotted line. The reduction of the cross section in FIG. 2 and 3 is effected in the same way, the connection of two flaps at the bottom giving a high degree of stability.

According to FIG. 4 the size of the cross section is changed by turning the pipes 2 and thus rotating the flaps.

While specific embodiments of the invention have been shown and described in detail to illustrate the application of the principles of the invention, it will be understood that the invention may be embodied otherwise without departing from such principles.

What is claimed is:

1. A venturi cooler for a flue gas desulphurization plant, comprising a cooler housing having a longitudinal flue gas flow path, a plurality of liquid pipes positioned perpendicular to said longitudinal flow path, a liquid spray nozzle associated with said pipes, and baffles adjustably attached to said pipes and selectively positionable to reduce the cross section of the flow of the Venturi cooler to leave said spray nozzles open for discharging liquid arranged in said flow path, said baffles comprising sleeve members surrounding said pipes having openings facing said spray nozzles and said baffles including rotatable flaps which are positionable to close off selected portions of the gas flow through said gas flow path.

2. A Venturi cooler according to claim 1, wherein said rotatable flaps have a width in the direction of flow which is substantially equal to the spacing between said pipes.

3. A Venturi cooler according to claim 1, wherein said rotatable flaps are fixed to said sleeves which surround said pipes and can be rotated on them, said baffles having openings large enough to leave the water spray nozzle in opened position in any position of said baffles.

4. A Venturi cooler according to claim 3, wherein two flaps are attached to each rotatable sleeve, one on either side of the axis thereof.

5. A Venturi cooler according to claim 4, wherein the connection of said two flaps has a sharp edge.

6. A Venturi cooler according to claim 4, wherein the connection of said two flaps has a rounded edge.

7. A venturi-type cooler comprising a housing defining a flow path therethrough, a plurality of liquid pipes extending through said flow path, each of said pipes having a discharge nozzle, baffle means positioned around said pipes and being adjustably movable for closing selective portions of said flow path, said baffles means comprising a sleeve positionable around each of said pipes, each said sleeve having an opening therein corresponding to the position of a spray nozzle, and at least one baffle flap member secured to the circumference of each of said sleeves, each said baffle flap member being positionable by rotation of a corresponding one of said sleeves to close off selective portions of said flow path.

8. A Venturi-type cooler according to claim 7, wherein said baffle means includes a curved baffle member secured to said sleeve of a length substantially equal to the spacing between said sleeves.

9. A venturi cooler for a flue gas desulphurization plant, comprising a cooler housing having a longitudinal flue gas flow path, a plurality of liquid pipes positioned perpendicular to said longitudinal flow path, a liquid spray nozzle associated with said pipes, and baffle means adjustably attached to said pipes and selectively positionable to reduce the cross section of the flow of the Venturi cooler to leave said spray nozzle open for discharging liquid arranged in said flow path, said baffle means comprising rotatable flaps which are positionable to close off selective portions of the gas flow through said gas flow path, said rotatable flaps being attached to said pipes and said pipes being mounted rotatably on their axis.

10. A venturi-type cooler comprising a housing defining a flow path therethrough, a plurality of liquid conveying pipes extending through said flow path, each of said pipes having a discharge nozzle, baffle means positioned around said pipes and being adjustably movable for closing selective portions of said flow path, said baffle means including a baffle sleeve attached to a corresponding pipe and at least two baffle flaps secured to said sleeves at spaced circumferential locations.

* * * * *